United States Patent [19]

Culp et al.

[11] Patent Number: 6,057,012
[45] Date of Patent: May 2, 2000

[54] METHOD FOR RECONDITIONING A PROPANE GAS TANK

[75] Inventors: Joseph T. Culp; Richard Belmont, both of Winston-Salem, N.C.

[73] Assignee: Blue Rhino Corporation, Winston-Salem, N.C.

[21] Appl. No.: 09/326,448

[22] Filed: Jun. 4, 1999

Related U.S. Application Data

[62] Division of application No. 08/886,326, Jul. 1, 1997, Pat. No. 5,922,158.

[51] Int. Cl.$^7$ .............................. B32B 1/02; B32B 31/26
[52] U.S. Cl. ......................... 428/34.9; 220/581; 220/586; 220/62.14
[58] Field of Search .................... 156/86, 94; 29/402.09, 29/447; 220/62.14, 62.22, 581, 586; 264/36.1, 36.5, 342 R; 428/34.9

[56] References Cited

U.S. PATENT DOCUMENTS

| | | | |
|---|---|---|---|
| 3,760,968 | 9/1973 | Amberg et al. ...................... 215/12 R |
| 3,767,496 | 10/1973 | Amberg et al. . | |
| 4,190,168 | 2/1980 | Jacques . | |
| 4,483,890 | 11/1984 | Beery et al. ................................. 428/7 |
| 4,964,930 | 10/1990 | Conn . | |
| 5,009,730 | 4/1991 | Tozier . | |
| 5,240,529 | 8/1993 | Hoffman . | |
| 5,422,152 | 6/1995 | Langeland et al. ..................... 428/36.9 |
| 5,711,039 | 1/1998 | Mizrahi ....................................... 4/344 |

*Primary Examiner*—Sam Chuan Yao
*Attorney, Agent, or Firm*—Leydig, Voit & Mayer, Ltd.

[57] ABSTRACT

A propane fuel storage tank having a fuel-containing tank body with an outer printed sleeve made of linear heat-shrink plastic material heat-shrunk in tight fitting encircling relation about the tank for preventing viewing of surface imperfections in the tank beneath the sleeve. A method of making and reconditioning propane fuel tanks is disclosed which includes loosely positioning a sleeve of such linear heat-shrinkable plastic material about the tank body and exposing the plastic sleeve to a temperature above its heat-shrink temperature to cause it to contract and tightly conform about the outer perimeter of the tank. The sleeve preferably encompasses a central cylindrical side wall of the tank, portions of the upper and lower semi-spherical end walls of the tank, and the lower foot ring, which results in a like-new reconditioned tank without the necessity for complete removal of surface imperfections and prior adhesively applied labels, or the need for complete repainting of the tank.

12 Claims, 5 Drawing Sheets

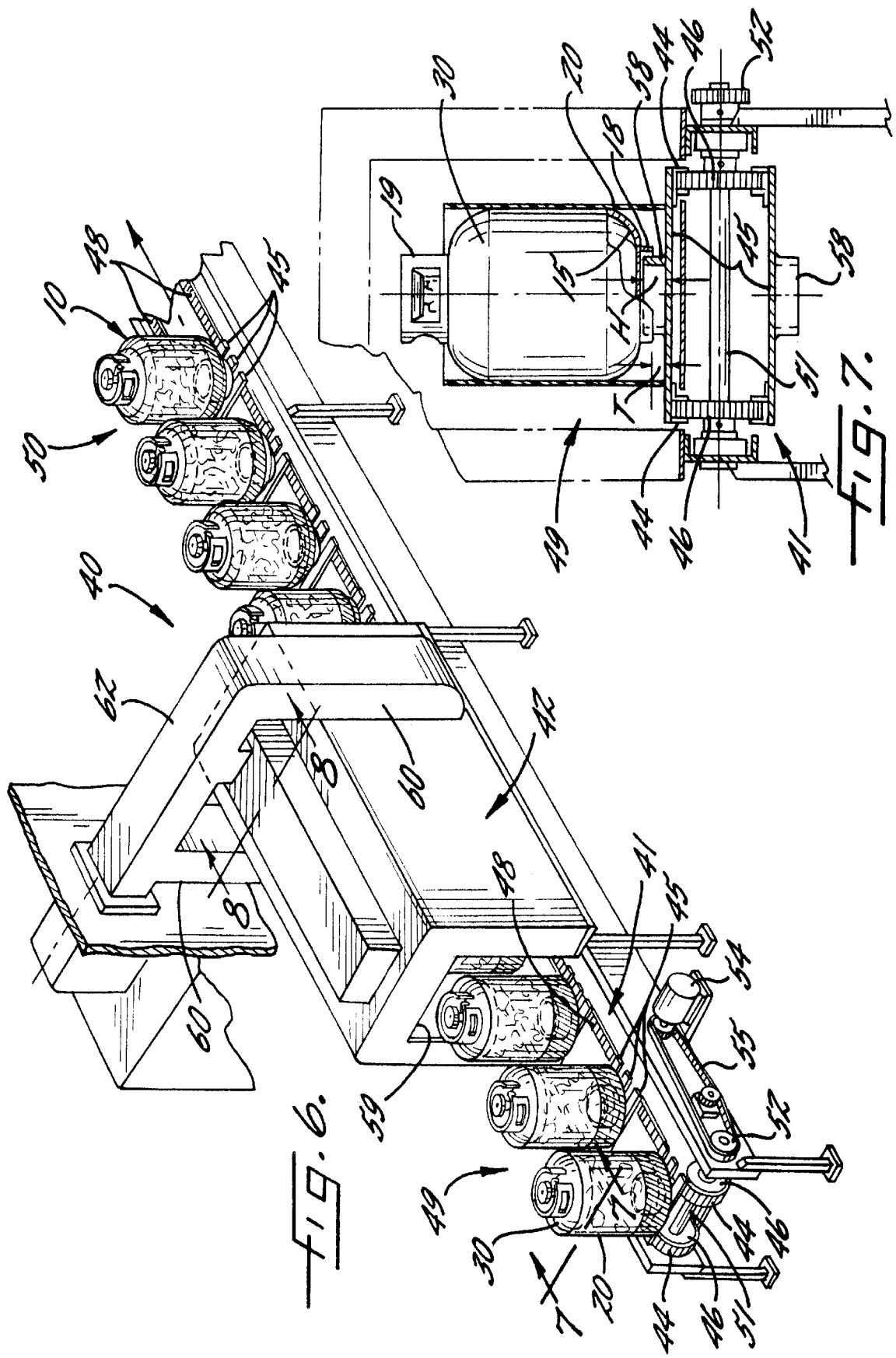

6,057,012

METHOD FOR RECONDITIONING A PROPANE GAS TANK

This application is a divisional of application Ser. No. 08/886,326 filed Jul. 1, 1997, now U.S. Pat. No. 5,922,158.

FIELD OF THE INVENTION

The present invention relates generally to propane fuel storage tanks, and more particularly, to an improved method and apparatus for reconditioning propane fuel tanks of a type typically used for barbecue grills.

BACKGROUND OF THE INVENTION

More than half the barbecue grills used today are powered by propane fuel contained in refillable propane tanks. The tanks are constructed according to industry standards and typically are painted and bear operating and instruction labels adhesively applied to the tank. Because barbecue grills usually are kept out of doors, over time the propane fuel tanks become soiled with cooking grease, scratched, rusted, and weathered. With increasing popularity of gas grilling, to alleviate inconvenience to the user in refilling the tanks, exchange centers have been established that will exchange empty propane gas tanks for filled and reconditioned tanks.

The exchange center will recondition the old tank as necessary for reuse. Reconditioning may involve washing the tank to remove grease and dirt, grinding or blasting the tank with metal shot to remove rust, removing old labels, repainting the tank, and applying new labels. The reconditioning process can be tedious, time consuming, and costly. Complete removal of the old labels, for example, can be difficult because adhesives employed are designed to permanently secure the label under all weather conditions. Moreover, because the exchange centers commonly are operated by small proprietors without sophisticated reconditioning and painting systems, unsightly blemishes in exposed surfaces of the tanks may remain after repainting. Hence, even when the tanks have been reconditioned, they may not have a consistent, professionally finished appearance.

A further problem with such propane storage tanks is that after initial use of a refilled tank, the user often has difficulty knowing the amount of fuel remaining in the tank. It is not an uncommon occurrence during summer holidays, when outdoor barbecuing is most frequently carried out and refill centers are closed, that fuel in the tank becomes unexpectedly extinguished.

OBJECTS AND SUMMARY OF THE INVENTION

It is an object of the invention to provide a method of reconditioning propane fuel storage tanks which can be more economically and easily carried out with consistent quality and appearance in the finished product.

Another object is to provide a method as characterized above which eliminates the time consuming and tedious task of completely removing old labels that have been adhesively applied to the tank. A further object is to provide a method of the above kind which further eliminates the necessity for complete repainting of the tank during reconditioning.

Still another object is to provide a method of reconditioning propane fuel tanks in which new identifying indicia and instructional information is applied to the container as an incident to the reconditioning process without the necessity for separate or adhesively applied labeling.

Another object is to provide a propane fuel tank that is more effectively protected from damage and rust during usage.

Yet another object is to provide a propane fuel tank with self-contained indicator means for enabling the user to easily and accurately determine the remaining amount of fuel contained therein. A related object is to provide a method of reconditioning the propane tank in which the fuel level indicator means is provided as an incident to the reconditioning process.

Other objects and advantages of the invention will become apparent upon reading the following detailed description and upon reference to the drawings, in which:

BRIEF DESCRIPTION OF THE DRAWINGS

FIG. 6 is a perspective of the conveyor transferring a succession of propane tanks with heat-shrinkable plastic sleeves loosely positioned thereon through a heat-shrink tunnel;

FIG. 7 is an enlarged vertical section, taken in the plane of line 7—7 in FIG. 6;

Figure 1:
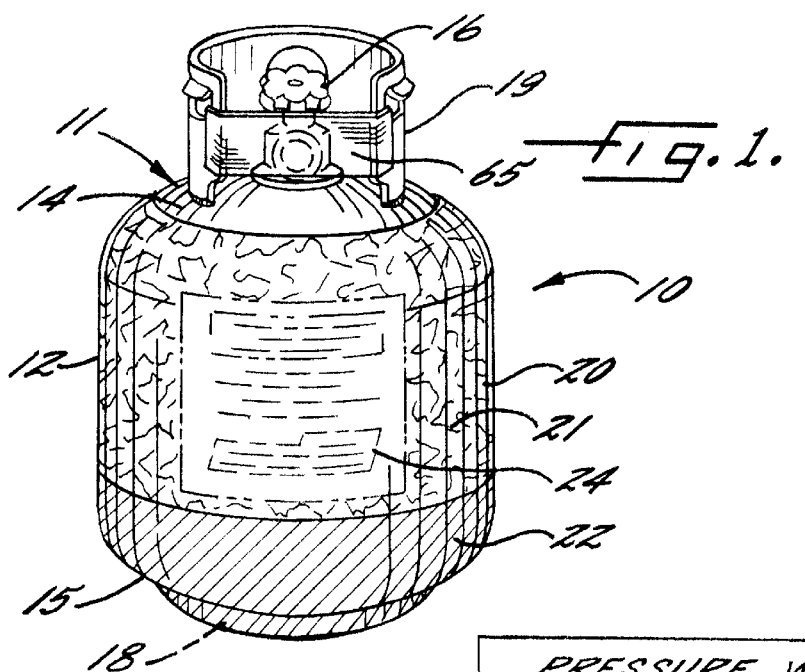
FIG. 1 is a perspective of an illustrative propane fuel storage tank embodying the present invention.
Figure 2:
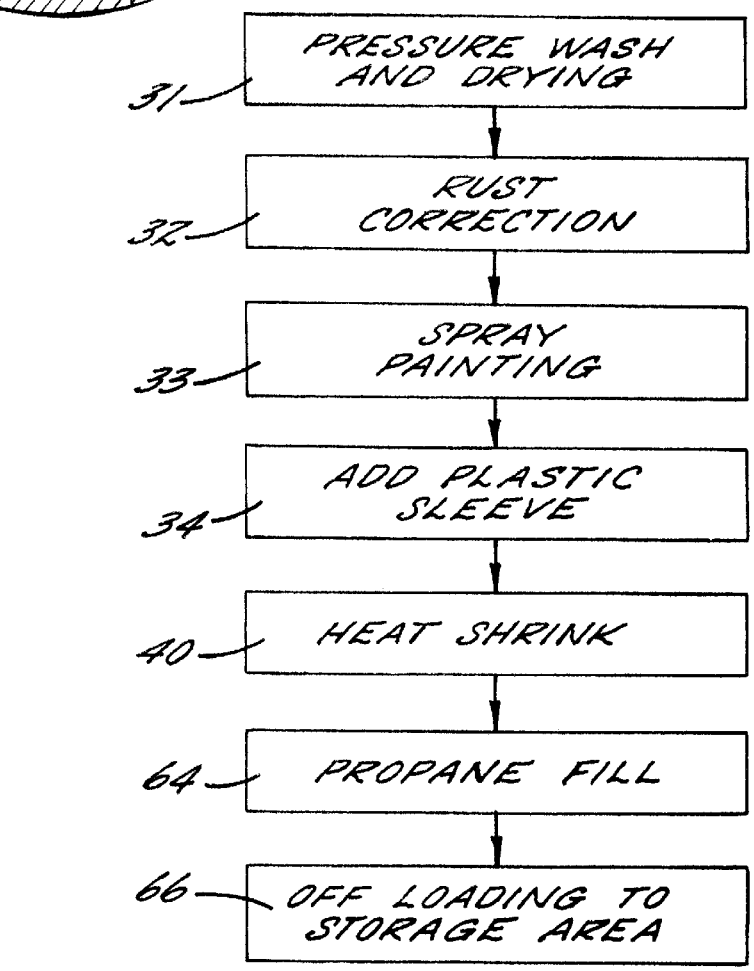
FIG. 2 is a flow chart of a method of reconditioning a propane fuel storage tank in accordance with the invention.

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE DRAWING

Referring now more particularly to the drawings, there is shown an illustrative propane fuel storage tank 10 embodying the present invention. The tank 10 has a hollow fuel-containing body 11 defined by a cylindrical side wall 12 and generally semi-spherical top and bottom end walls 14, 15. A conventional valve 16 is mounted in the top wall 15 for enabling propane fuel to be introduced into the tank during a fill operation and then for enabling the filled tank to be removably connected to the fuel line of a gas grill. A generally cylindrical foot ring 18 smaller in diameter than the cylindrical tank body is secured to the bottom end wall 15 for supporting the tank in upright position. A semicircular collar 19, also smaller in diameter than the tank body 11, is secured in upstanding relation to the top end wall 14 for protecting the valve 16 and providing a handle for lifting and carrying the tank. It will be understood that the tank body 11, valve 16, foot ring 18, and collar 19 are constructed consistent with industry standards.

In accordance with the invention, the propane fuel tank has a heat-shrink plastic sleeve or cover in tight fitting surrounding relation to the tank body for concealing unsightly surface defects in the body following reconditioning, for providing the tank with a consistent, professionally finished appearance, for protecting the tank from damage and rust during reuse, and for bearing printed indicia and instructional information in order to eliminate the necessity for separate or adhesively applied labeling. To this end, the tank 10 has a plastic sleeve 20 preferably made of a linear heat-shrink, polyvinyl chloride (PVC) material. The plastic sleeve 20 in this instance extends from a base of the collar 19 to the bottom of the foot ring 18 and is heat-shrunk in a tight fitting, substantially wrinkle-free condition about the cylindrical side wall 12, portions of the spherical end walls 14, 15, and the foot ring 18. The PVC material of the sleeve may be a commercially available type having a relatively thin gauge thickness, such as about 0.002–0.003 mm. and designed for 50 percent shrinkage in a lateral direction (X) and 10 percent shrinkage in a longitudinal direction (Y) when subjected to a heat-shrink temperature of 375 degrees.

In keeping with the invention, the plastic sleeve 20 is printed to give it an opacity for hiding imperfections, discoloration, or hard to remove grease and soil that might exist on the exterior surface of the tank beneath the sleeve. The sleeve 20 preferably is made of a clear PVC plastic material that is printed on its inner side in a conventional multi-color, flexo-printing operation to provide it with an irregular, preferably camouflage, pattern 21. Not only does the opacity of the sleeve 20 hide imperfections that might exist in the underlying surface of the tank, the camouflage pattern 21 of the printing unexpectedly makes less noticeable slight irregularities that might exist in the surface of the plastic sleeve itself, either as a result of irregularities in the underlying surface of the tank or as a result of slight wrinkling that might occur in the plastic as it is shrunk about the curved semi-spherical end walls 14, 15 and the foot ring 18 of the tank. The camouflage printed sleeve, hence, enables the tank to be produced or reconditioned with less stringent quality control. In the illustrated embodiment, the sleeve 20 is printed with a solid accent border 22 along its bottom perimeter to accentuate the base of the tank for aesthetic purposes.

In further carrying out the invention, the heat-shrink plastic sleeve 20 is printed with indicia and operating instructions 24 so as to eliminate the necessity for separate adhesively applied labeling. It will be understood by one skilled in the art that such indicia and instructional information can be pre-printed on the inner surface of the plastic sheet material when printing the opaque camouflage pattern 21 and the bottom border 22.

Figure 9:
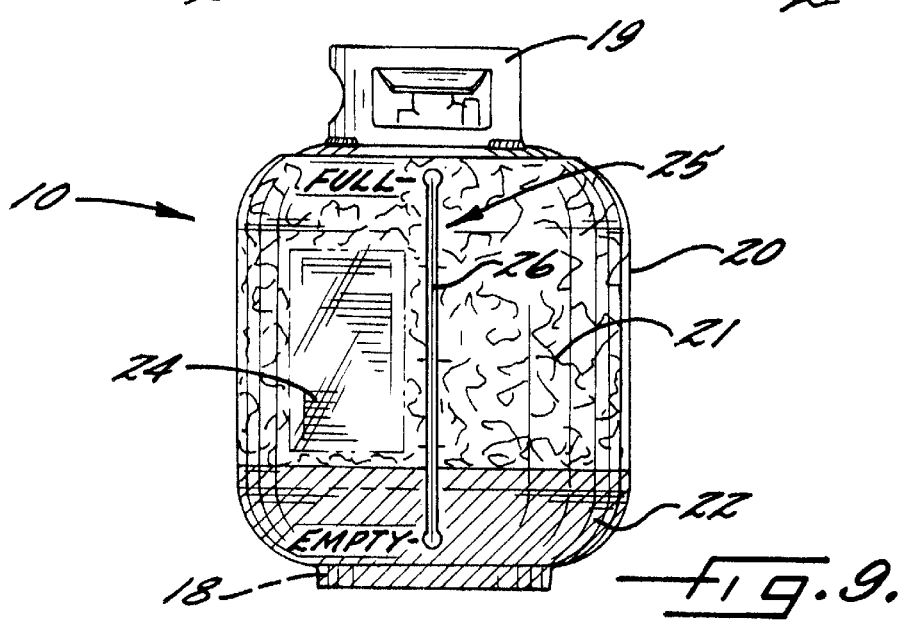
FIG. 9 is a plan view of a finished propane tank, and particularly, illustrating the self-contained fuel indicator thereon.

In accordance with still a further feature of the invention, the heat-shrink plastic sleeve 20 has a propane fuel level indicator 25 printed thereon (FIG. 9) with heat sensitive ink for enabling the user to easily check the amount of fuel remaining in the tank after usage. The fuel indicator 25 in this case is in the form of a vertically disposed graduated fuel indicator line 26. The indicator 25 preferably is printed on the inner surface of the plastic sheet material of the sleeve simultaneously with printing of the opaque camouflage pattern 21, the border 22, and the instructional information 24, but with a heat sensitive ink, such as a conventional thermal chromatic ink.

To determine fuel level in the tank, the user need only pour hot water over the temperature indicator line 26. Upon such occurrence, the fuel remaining in the tank will act as a heat sink and cause heat in that portion of the tank to more rapidly dissipate than in the empty portion of the tank above the fuel level. The resulting temperature differential of the tank, i.e. the lower portion being cooler than the upper portion, is immediately sensed by the temperature sensitive ink of the fuel indicator line 24, providing a quick, easy and accurate indication of the remaining fuel level in the tank.

Pursuant to an important aspect of the invention, an improved method and apparatus is provided for reconditioning propane fuel tanks, including the tank 10. As background to the invention, and as indicated above, propane tank refilling and reconditioning centers have been widely established for the convenience of users of propane fuel tanks. These centers enable the user to simply return an empty propane tank in exchange for a filled and reconditioned tank. Such refill and reconditioning centers may handle thousands of empty propane tanks daily, many of which are severely soiled, defaced, and weathered.

To recondition propane tanks, it is known to expose the container to a thorough washing cycle for removing dirt, grease, and other soil that has accumulated during the course of time on the exterior of the container. The tank may then be run through a shot blast and/or grinding operation to remove rust and other surface imperfections. Since neither washing, shot blasting, or grinding typically is effective for completely removing existing adhesively applied labels to the container, manual removal of the remaining labels can be tedious and time consuming. When the tank has been cleaned of all surface dirt, imperfections, and labels, it is then repainted and relabeled.

In accordance with the present invention, a propane tank reconditioning method is provided that substantially minimizes cleaning, resurfacing, repainting, and relabeling of the used propane tanks. More particularly, the method comprises the steps of (1) washing the tank, without the necessity for complete removal of soil and contaminants over most of the surface area, (2) removing or covering rust, without the necessity for shot blasting or grinding the entire tank; (3) repainting the tank, without the necessity for painting most of the surface area, (4) loosely applying a linear heat-shrinkable plastic sheet cover about the tank; and (5) exposing the heat-shrink plastic sheet to a temperature above its heat-shrink temperature for causing the plastic material to tightly conform about the cylindrical side walls and portions of the semi-spherical end walls of the tank to hide surface imperfections, contaminants, and prior labels beneath the plastic sheet material and to provide the tank with a consistent, professionally refinished appearance.

With reference to FIGS. 2–9, there is depicted an illustrated method and apparatus in accordance with the invention for reconditioning used propane fuel storage tanks. Used tanks 30 preferably are washed at a washing and drying station 31 in a conventional manner. Unlike conventional practice, it is unnecessary that soil and contaminants be completely removed from the major surface area of the tank, namely the longitudinal area between the junctures of the collar 19 and foot ring 18 with the tank body. Nor is it necessary that existing labeling be completely removed in that area. Instead, it is sufficient to remove loosened labels or portions thereof, while leaving the remaining labels intact.

The tanks 30 are then advanced to a rust correction station 32. At this station, rust on the used container 30 may be either removed or covered in a conventional manner. Consistent with the present invention, however, the container often need not be exposed to a conventional shot blast or grinding operations for rust removal. Less severe rust existing on the major surface area of the tank between the collar 19 and foot ring 18 often need only be sprayed with a rust resistant paint, without the necessity for surface reworking.

The tanks 30 are next advanced to a painting station 33. While the tanks 30 may be repainted in a conventional manner, again according to the method of the present invention, complete repainting is unnecessary. Since only the foot ring 18, collar 19, and portions of the top and bottom end walls 14, 15 will be exposed after reconditioning, painting of those areas can be carried out by hand-spraying where necessary, without the expense of elaborate automated painting lines.

Figure 4:
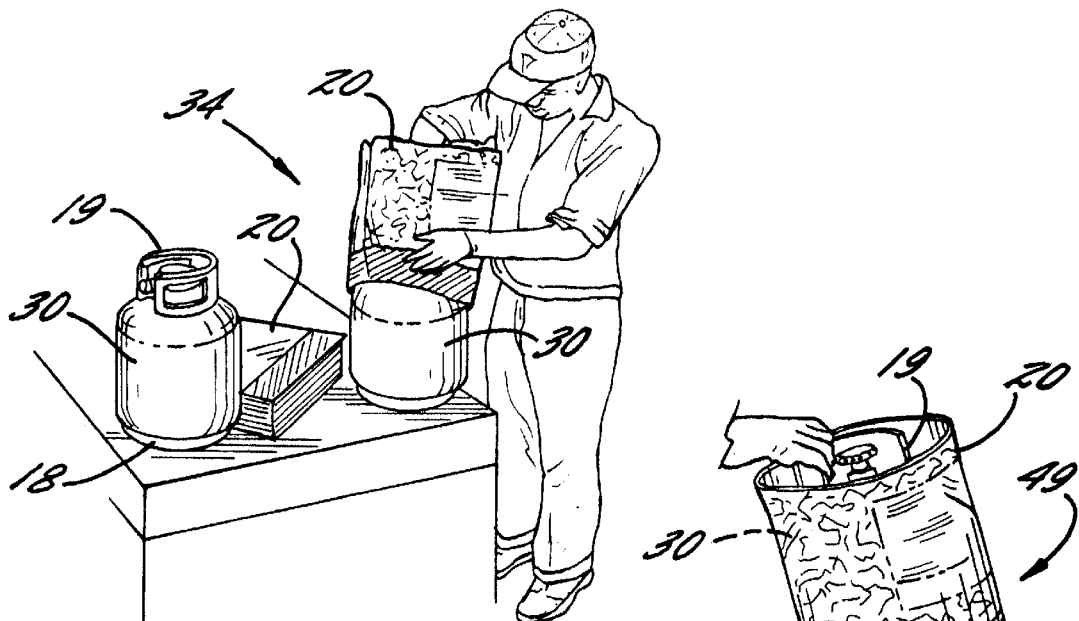
FIG. 4 is a perspective illustrating placement of a heat-shrinkable sleeve over a propane container.
Figure 5:
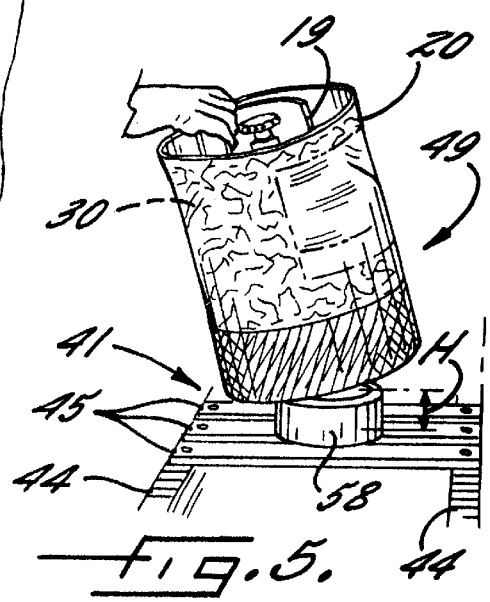
FIG. 5 is a perspective illustrating placement of the propane container with a loosely positioned heat-shrinkable plastic sleeve onto a conveyor.
Figure 8:
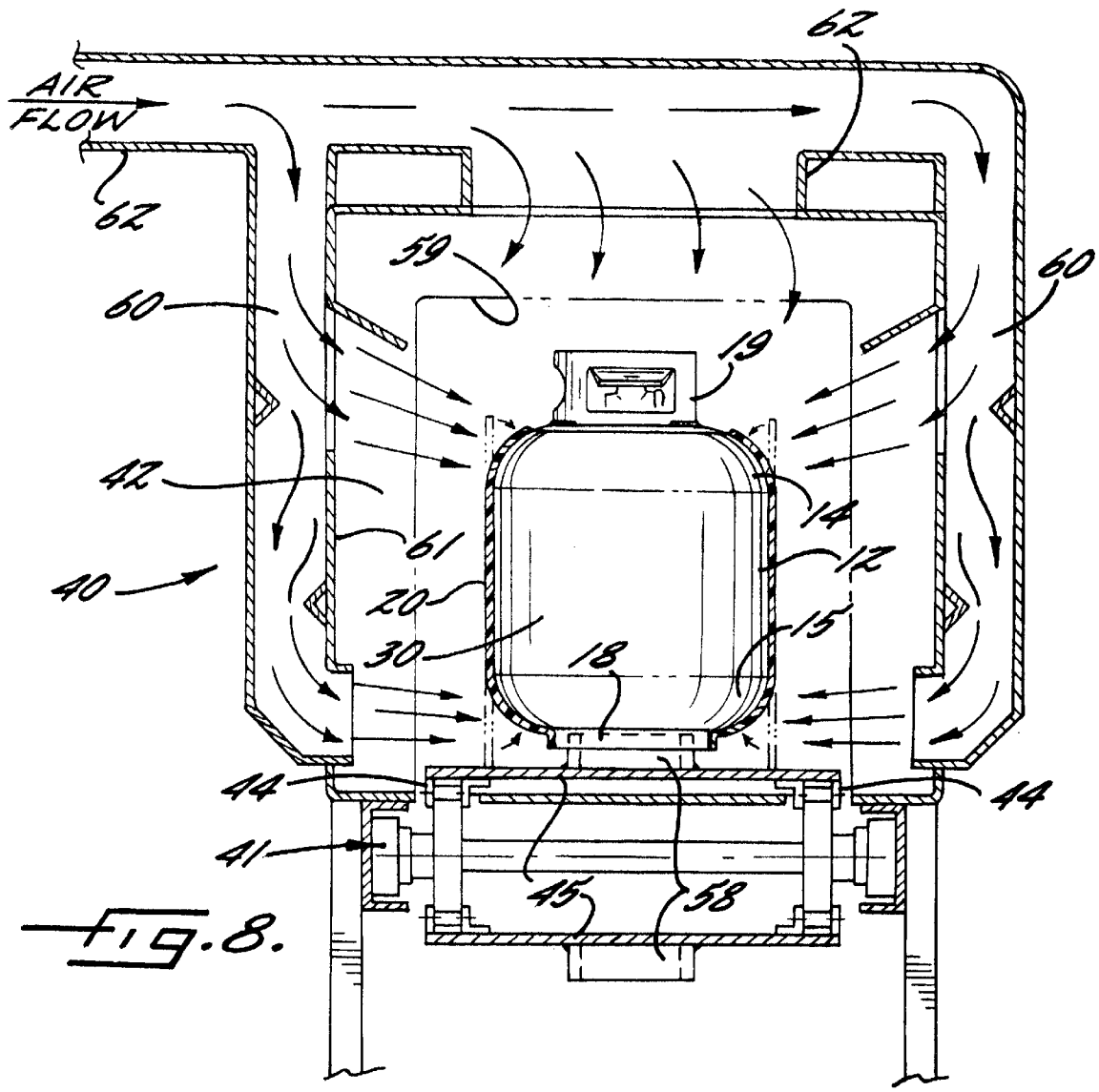
FIG. 8 is an enlarged vertical section taken in the plane of line 8—8 in FIG. 7.

In carrying out the method of the invention, the tank 30 is next transferred to a covering station 34 where a heat-shrink PVC sheet material is loosely placed about the container 30 (FIG. 4). As indicated previously, the PVC plastic material may be of a clear, thin gauge material, pre-printed on one side in a multi-color printing operation for creating an opaque, irregular, preferably camouflage, pattern that gives the plastic sheet sufficient opacity to prevent viewing of surface imperfections on the tank over which the plastic sheet material is placed. The plastic sheet material also has a temperature indicator pre-printed thereon with heat sensitive ink as previously described. The heat-shrink plastic material preferably is pre-formed into a tubular sleeve 20, being heat welded along a longitudinal edge 38 in a conventional manner.

Figure 3:
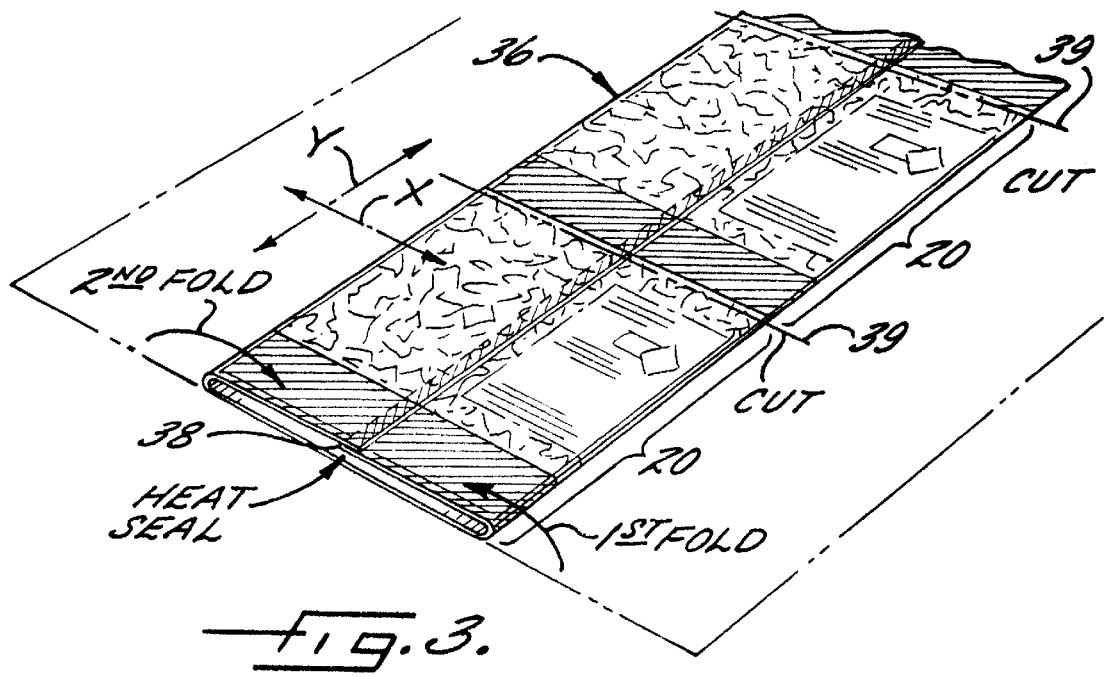
FIG. 3 is a perspective sheet of pre-printed heat-shrinkable PVC plastic material being produced into protective sleeves for use in making and reconditioning propane fuel tanks in accordance with the invention.

As illustrated in FIG. 3, the sleeves 20 may be produced by pre-printing an elongated web 36 of PVC heat-shrinkable plastic, folding the web over upon itself, heat-sealing the longitudinal edges 38, and cutting the web into the individual sleeves 20 along longitudinally spaced cut lines 39. The heat-shrink plastic sleeves 20 are formed such that the lateral shrink direction X will be transverse to the longitudinal or vertical axis of the tank 30 and the longitudinal shrink direction Y is parallel to the axis of the tank. The tubular sleeves 20 are formed sufficiently large to enable easy positioning over the top of the tanks 30, but small enough that upon heating it will shrink into tightly fitting relation with the tank. In practice, sleeves having a diameter of 313 mm. have been found suitable for use with standard 20# propane fuel storage tanks having a diameter of 305 mm. The sleeves preferably have an initial height of about 428.62 mm., which corresponds to the distance from the bottom of the tank foot ring 18 to slightly above the base of the collar 19. It will be appreciated that the sleeves 20 may be circumferentially positioned on the tank in a uniform manner, such as by aligning the printed logo or other indicia 24 with the valve 16 or open side of the collar 19, as illustrated in FIG. 1.

With the heat-shrink plastic sleeve 20 loosely positioned about the tank 30, the tank is then processed to a heat-shrink station 40 in accordance with the invention. An illustrative heat-shrink apparatus or station 40, depicted in FIGS. 5–7, includes a conveyor 41 passing through a heat tunnel 42. The conveyor 41 in this case comprises a pair of laterally spaced chains 44 interconnected by a plurality of longitudinally spaced, lateral slats 45. The chains 44 are disposed about respective sprockets 46 so that upper legs 48 thereof extend from a loading station 49 (FIGS. 6 and 7) upstream of the heat tunnel 42 to an unloading station 50 downstream of the heat tunnel 42. For driving the chains 44, the upstream chain sprockets 46 have a common drive shaft 51, which in turn carries a drive sprocket 52 rotatably driven by a drive motor 54 through a drive chain 55.

In carrying out a further feature of the invention, the conveyor has a plurality of laterally spaced upstanding tank supports for carrying the tanks 30 in elevated relation to the upper surface of the conveyor 41 defined by the lateral slats 45 and for locating the loosely placed plastic sleeve 20 in predetermined longitudinal relation to the tank 30 for proper shrink wrap engagement with the tank. The supports in this case are in the form of annular collars 58 affixed in upstanding relation to respective cross-slats 45 by appropriate fasteners. The collars 58 are slightly smaller in diameter than the tank foot rings 18 so as to enable the foot rings 18 to be easily positioned over the collars 58 with the spherical bottom wall 15 of the tank supported by the respective collar 58. The collars 58 have a height "H" (FIG. 5) such that it will support the bottom spherical end wall of the tank with the foot ring in predetermined spaced relation to the conveyor surface, such as a spacing "T" of about 2½ inches (FIG. 7).

It will be seen that when a tank 30 with a plastic sleeve 20 loosely positioned about the tank is positioned on the collar 58 (FIG. 5), the sleeve 20 will slip down until its lower edge is supported by the conveyor slats 45. It will be understood by one skilled in the art that the plastic PVC sheet material, while flexible in nature, will remain in a substantially upright position about the upstanding tank 30. Hence, positioning the tank 30 on the collar automatically locates the sleeve 20 in predetermined longitudinal relation to the tank for conveyance into and through the heat tunnel 42 upon advancement of the conveyor chains 44.

The heat tunnel 42 in this instance is an elongated rectangular enclosure having upstream and downstream openings 59, sized to permit the conveyor to move propane tanks 30 successfully through the tunnel. The tunnel 42 has a conventional gas heater mounted outside the tunnel for heating the tunnel to temperatures in excess of the heat-shrink temperatures of the PVC plastic material of the sleeves 20. Hence, as the tanks 30 are directed into the heat tunnel 42 by the conveyor 41, the sleeves are exposed to the heat-shrink temperature and the PVC material will quickly shrink up to 50 percent in lateral direction X into close tight fitting relation to the cylindrical side wall 12 of the tank, the portion of the semi-spherical upper end wall 14 up to the collar 19, the portion of the spherical bottom end wall 15 up to the foot ring 18, around the foot ring 18, and partially under the foot ring 18. To facilitate conforming upper and lower ends of the plastic sleeve 20 about the semi-spherical end walls 14, 15 of a tank and the foot ring 18 pressurized air is directed inwardly against the sleeves from air ducts 60 communicating through opposite side walls 61 of the tunnel 42. The ducts 60 in this case are connected through a common duct 62 supplied with pressurized air from an appropriate pump disposed outside the heat tunnel. It will be understood that the amount the plastic sleeve extends under the foot ring 18 is determined by the height of the conveyor collars 58. Preferably the sleeve does not completely close the underside of the foot ring 18 so that an opening remains therein to permit drainage of condensed moisture that might occur on the bottom of the fuel-containing tank during usage.

It has been unexpectedly found that the heat-shrink sleeve 20 gives the tank a clean, consistent, and new appearance. Because of the orientation of the heat-shrink sleeve 20 about the tank with maximum shrinkage occurring in the lateral direction X, the sleeve will tightly conform about the spherical end walls 14, 15 and the foot ring 18 in a substantially wrinkle-free condition. The irregular or camouflage printing of the sleeve not only hides underlying surface imperfections in the tank, in the event slight wrinkles do occur during the shrink-wrap operation, the camouflage printing renders them substantially unnoticeable.

Following the heat-shrink operation, the tanks 30 may be transferred to a fill station 64 where they are refilled with propane gas, tested for leaks, and provided with an appropriate valve identification label 65 (FIG. 1) about the collar 19. The reconditioned tanks may then be transferred to a storage area 66 for redistribution.

It will be understood by one skilled in the art that while a reconditioning method has been described which includes washing, painting, label removing, rust correction, and repainting, depending on the condition of the tank returned to the reconditioning center, it may be possible to forego many of the reconditioning steps, with the tank being advanced directly to the cover and heat-shrink stations 34, 40. It will further be appreciated that when a propane tank 30 having a heat-shrunk sleeve 20 is returned to a reconditioning center, a new plastic sleeve may be positioned directly over the existing plastic sleeve if it is fully intact on the container, to quickly and easily provide the container with a clean, like-new appearance.

Figure 10:
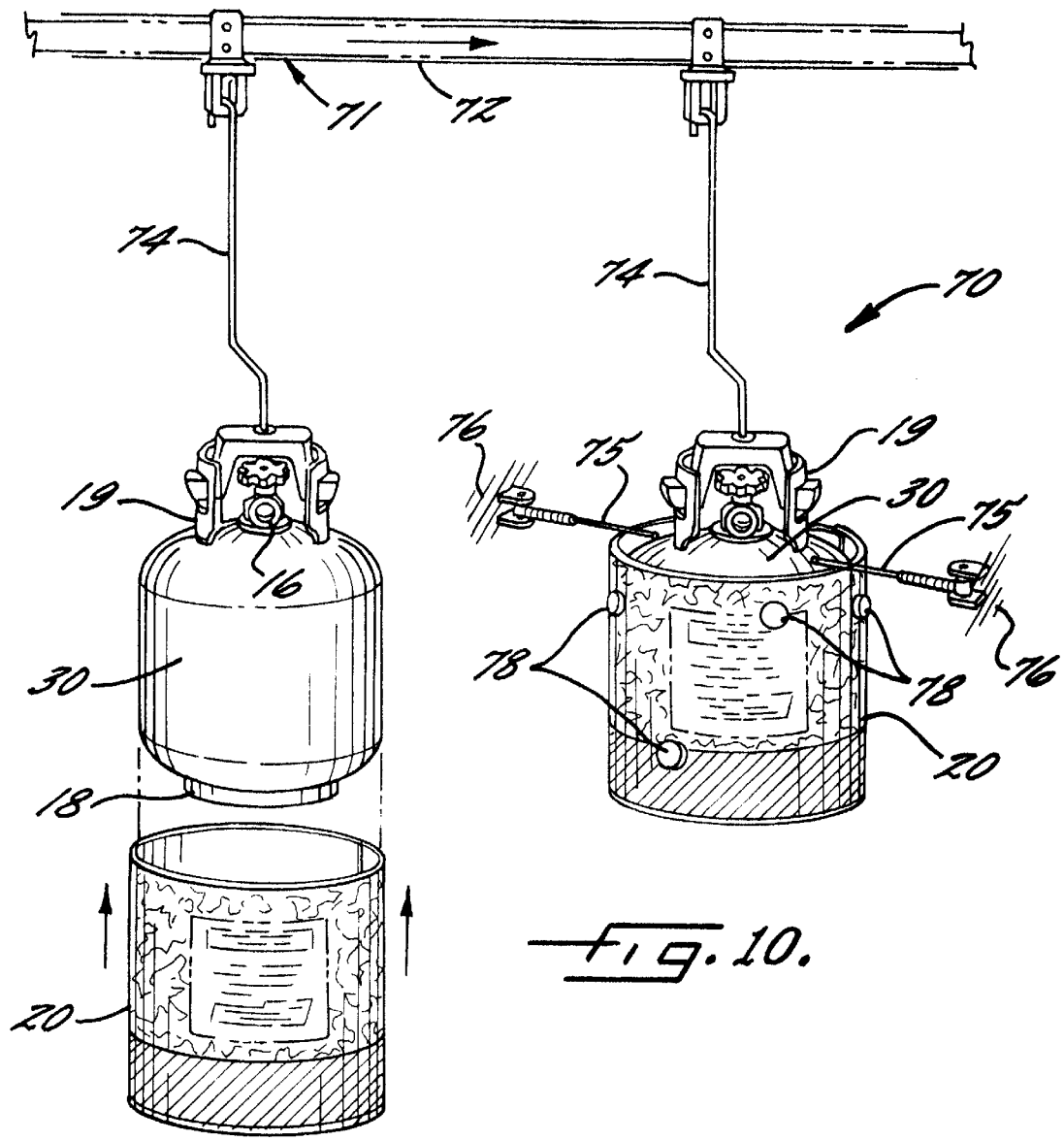
FIG. 10 is a perspective of an alternative apparatus for transferring propane tanks with loosely positioned heat-shrinkable plastic sleeves thereon through a heat-shrink tunnel.

Referring now to FIG. 10, there is shown an alternative embodiment of heat-shrink apparatus 70 according to the invention. The heat-shrink apparatus 70 in this case has a conveyor 71 for supporting tanks 30 in hanging relation from the collar 19. The conveyor 71 includes a power driven chain 72 having longitudinally spaced hanging hooks 74 upon which respective tanks 30 can be hung by the collar 19 at a loading station 49. A tubular heat-shrink sleeve 20 in this case is positioned about the suspended tank 30 from an underside thereof. For locating the sleeve 20 in predetermined position with respect to the tank 30, flexible probes 75 extend outwardly from a side wall 76 to a position adjacent the conveyor 71. With the tank 30 suspended from a hook 74 of the conveyor at the loading station, the operator can manually position the sleeve 20 upwardly over the container from the bottom end until the upper edge of the sleeve engages the locator probes 75, at which point small magnets 78 are brought into magnetic contact with the tank 30 with the sleeve 20 interposed therebetween to secure the sleeve 20 in properly located position for advancement through the heat tunnel. Upon completion of the heat-shrink operation, the magnets 78 are simply removed from the finished tank.

Figure 11:
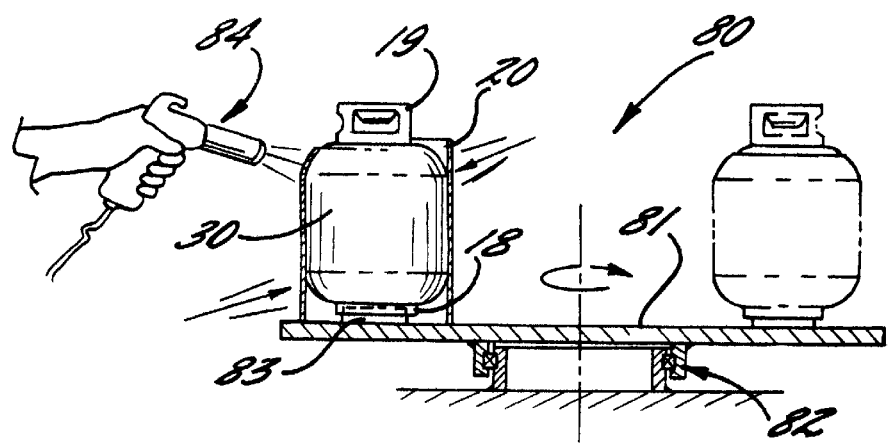
FIG. 11 is a perspective of still another alternative heat-shrink apparatus for making and reconditioning propane gas containers in accordance with the invention.

Referring now to FIG. 11, there is shown still another alternative embodiment of heat-shrink apparatus 80 according the present invention. The heat-shrink apparatus 80 in this case includes a circular turntable 81 supported on an appropriate bearing support structure 82 for rotational movement. The turntable 81 has a plurality of upstanding collars 83, similar to the conveyor collars described with respect to the embodiment of FIGS. 5–8, for supporting the tank 30 with the foot ring 18 thereof in predetermined spaced relation above the upper surface of the turntable 81. Upon positioning of the tank 30 with a plastic sleeve 20 loosely about it onto the turntable collar 83, the plastic sleeve 20 again will be supported by the turntable 81 in predetermined longitudinal relation to the tank 30, according to the height of the collar 83. For carrying out the heat-shrink operation in this case, hand-held hot air blowers 84 are utilized for directing hot air against the sleeve 20, while the turntable is rotated.

From the foregoing, it can be seen that the method and apparatus of the present invention are adapted for more simplified and economical reconditioning of used propane gas storage tanks with consistent quality and appearance in the finished product. The method eliminates or substantially reduces many of the time consuming and tedious tasks heretofore necessary in reconditioning used propane tanks. The reconditioned tank furthermore is more effectively protected from damage and rust during reusage and is provided with a new self-contained fuel level indicator during each reconditioning operation.

What is claimed is:

1. A reconditioned propane fuel storage tank comprising a used fuel containing body defined by a cylindrical side wall and top and bottom semi-spherical end walls, said body having surface imperfections from prior usage, a foot ring secured to the bottom end wall for supporting the body in an upright condition, a fuel control valve mounted in the upper end wall, a collar secured to the upper wall in surrounding relation to said valve, a sleeve made of linear heat-shrink plastic material heat shrunk in tight fitting encircling relation about at least the cylindrical side wall of the tank, said sleeve providing a reconditioned outer surface to at least the cylindrical side wall of the fuel containing body, and said sleeve having an opacity sufficient to substantially mask and conceal surface imperfections in the tank body beneath the sleeve.

2. The reconditioned propane fuel storage tank of claim 1 in which said sleeve surrounds and covers the entire cylindrical side wall of the tank body.

3. The reconditioned propane fuel storage tank of claim 1 in which said sleeve surrounds and covers the entire cylindrical side wall of the tank body and portions of the top and bottom spherical end walls.

4. The reconditioned propane fuel storage tank of claim 1 in which said foot ring and collar are smaller in diameter than the diameter of the cylindrical side wall of the tank body.

5. The reconditioned propane fuel storage tank of claim 1 in which said sleeve completely surrounds and tightly covers the surface area of said tank body from about a location where said collar is secured to said top end wall to at least a location where said foot ring is secured to said bottom end wall.

6. The reconditioned propane fuel storage tank of claim 5 in which said sleeve tightly surrounds and covers outer exposed sides of said foot ring.

7. The reconditioned propane fuel storage tank of claim 6 in which said sleeve extends about an underside of said foot ring.

8. The reconditioned propane fuel storage tank of claim 1 in which said sleeve is printed with an irregular pattern for masking surface irregularities of the tank beneath the sleeve.

9. The reconditioned propane fuel storage tank of claim 8 in which said sleeve is printed with a camouflage pattern.

10. The reconditioned propane fuel storage tank of claim 1 in which said sleeve is printed with instructional indicia.

11. The reconditioned propane fuel storage tank of claim 1 in which said sleeve is between about 2 and 3 mils. in thickness.

12. The reconditioned propane fuel storage tank of claim 1 in which said sleeve is heat-shrunk about portions of said top and bottom semi-spherical end walls in a substantially wrinkle free condition.

* * * * *